United States Patent [19]
Klein

[11] 3,880,438
[45] Apr. 29, 1975

[54] MULTI-USE FREIGHT CARRIER
[75] Inventor: Leo A. Klein, Seattle, Wash.
[73] Assignee: The Boeing Company, Seattle, Wash.
[22] Filed: Apr. 18, 1974
[21] Appl. No.: 462,053

[52] U.S. Cl. ............... 280/5 D; 105/358; 105/266; 222/144; 280/5 R; 280/5 F; 296/28 M
[51] Int. Cl. ............................................. B60p 3/22
[58] Field of Search ......... 296/35 R, 15, 28 M, 1 A, 296/28 R; 105/358, 360, 266, 265; 280/5 R, 5 C, 5 E, 5 D, 5 F; 298/8 H, 8 R; 222/144; 214/300

[56] References Cited
UNITED STATES PATENTS

| | | | |
|---|---|---|---|
| 2,169,463 | 8/1939 | Eisenberg | 298/8 H |
| 2,171,030 | 8/1939 | Gilson | 298/8 H |
| 2,845,298 | 7/1958 | Stoces | 296/35 R |
| 3,348,572 | 10/1967 | Hall | 280/5 E |
| 3,424,489 | 1/1969 | Hoy | 296/1 A |

FOREIGN PATENTS OR APPLICATIONS

| | | | |
|---|---|---|---|
| 375,238 | 3/1964 | Switzerland | 105/358 |
| 725,795 | 5/1932 | France | 222/144 |

*Primary Examiner*—Robert J. Spar
*Assistant Examiner*—Gary Auton
*Attorney, Agent, or Firm*—Donald A. Streck

[57] ABSTRACT

A freight carrier for eliminating the problem of "deadheading" caused by having only freight which is incompatible for storage in the container used for the delivery trip available for the return trip of the carrier. The disclosed multi-use freight carrier employs two containers on one chassis — one for each of the mutually incompatible freights. The unused, lighter container is carried above the loaded, heavier container so that the center of gravity remains low. Means are provided in one embodiment to rotate the containers about a longitudinal axis to exchange the active and passive container for the return trip. In another embodiment, the second container is nested within the first container when being used and is raised vertically and held above the first container when the first container is being used.

2 Claims, 11 Drawing Figures

MULTI-USE FREIGHT CARRIER

BACKGROUND OF THE INVENTION

1. Field of the Invention

Relates to freight carriers, and more particularly to freight carriers for transporting liquids and semi-liquids.

2. Description of the Prior Art

The cost of ground transportation of freight is increasing at a very high rate because of the small productivity improvements which can be applied in a practical fashion to this section of industry. The elimination of deadheading (one-way empty trips for lack of suitable freight for the carrier) is of vital importance in light of the present and future shortages in fuels. The present economic indicators are that the cost of freight may at least double within the next ten years. One current means for improving the situation is containerization for packaged type freight. The containers are basically truck vans which can be removed from the truck and carried on trains and ships for intermediate transportation. The related field which presently has no suitable analogy to such an approach is the hauling of liquids (petroleum products, juices, milk, etc.) and semi-liquids (grains, cement, etc.) which would allow multi-use of the same equipment. The problem is made more difficult by regulations covering subsequent reuse and cleaning for noncompatible cargos in common containers. The regulations are particularly stringent where foodstuffs are involved. While there are numerous multi-compartment or nesting compartment carriers in the prior art, none is designed to solve the problem presented here. For example, truck and trailer sand and log carriers nest the trailer in the truck for a more compact rig during the deadheading process. Any carrier which would solve the deadheading problem must allow one-way hauling capacity close to that of the present carriers, and operate within highway height, width, and length limitations while providing a safe center of gravity and loading location.

Thus, it is an object of the present invention to provide a multi-use freight carrier which will allow the transportation of mutually incompatible cargos at various times with a minimum of reconfiguration or preparation effort between cargos. It is a further object of the present invention to provide a multi-use freight carrier with a one-way capacity close to that of present single-use freight carriers operating within highway height, width, and length regulations while providing a safe center of gravity and loading location.

DESCRIPTION AND OPERATION OF THE INVENTION

While the drawings and descriptions that follow are directed to a truck, the present invention could be used equally well with other hauling means such as trailers, semi-trailers, barges, and railroad cars.

Figure 1:
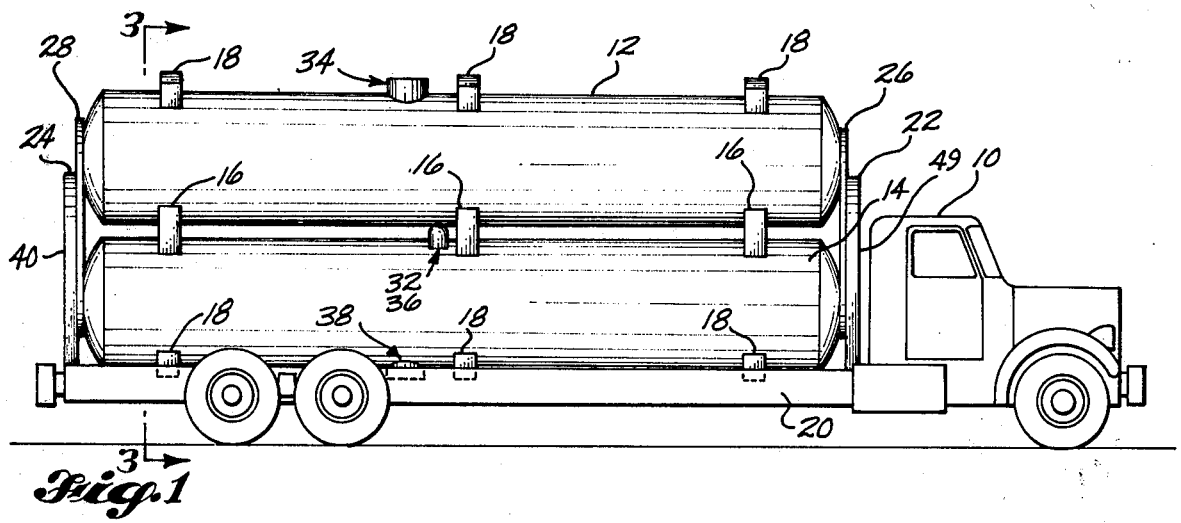
FIG. 1 is a side elevation of a truck employing the present invention in the two tank rotational embodiment having two tanks for liquids.

Referring to FIG. 1, a truck 10 employing the present invention has a first tank 12 and a second tank 14 separated and supported by spacers 16. When positioned to carry cargo as shown in FIG. 1, the lower (second) tank 14 is supported on supports 18 which mate with corresponding portions of the chassis 20 of the truck 10. Means (not shown) for securing the lower tank 14 to the chassis 20 can be provided. A front support member 22 and rear support member 24 are also provided to absorb forward sideward, and rearward forces on tanks 12 and 14 as well as providing additional stationary support and apparatus for changing the position of the tanks 12 and 14 as to be hereinafter described. Front joining plate 26 and rear joining plate 28 are removably attached to the ends of the tanks 12 and 14 and cooperate with front support member 22 and the rear support member 24 in the rotation of tanks 12 and 14.

Tanks 12 and 14 are attached to front joining plate 26 and rear joining plate 28 by bolts 29 allowing either or both of tanks 12 and 14 to be replaced or exchanged for repair or reconfiguration.

Figure 4:
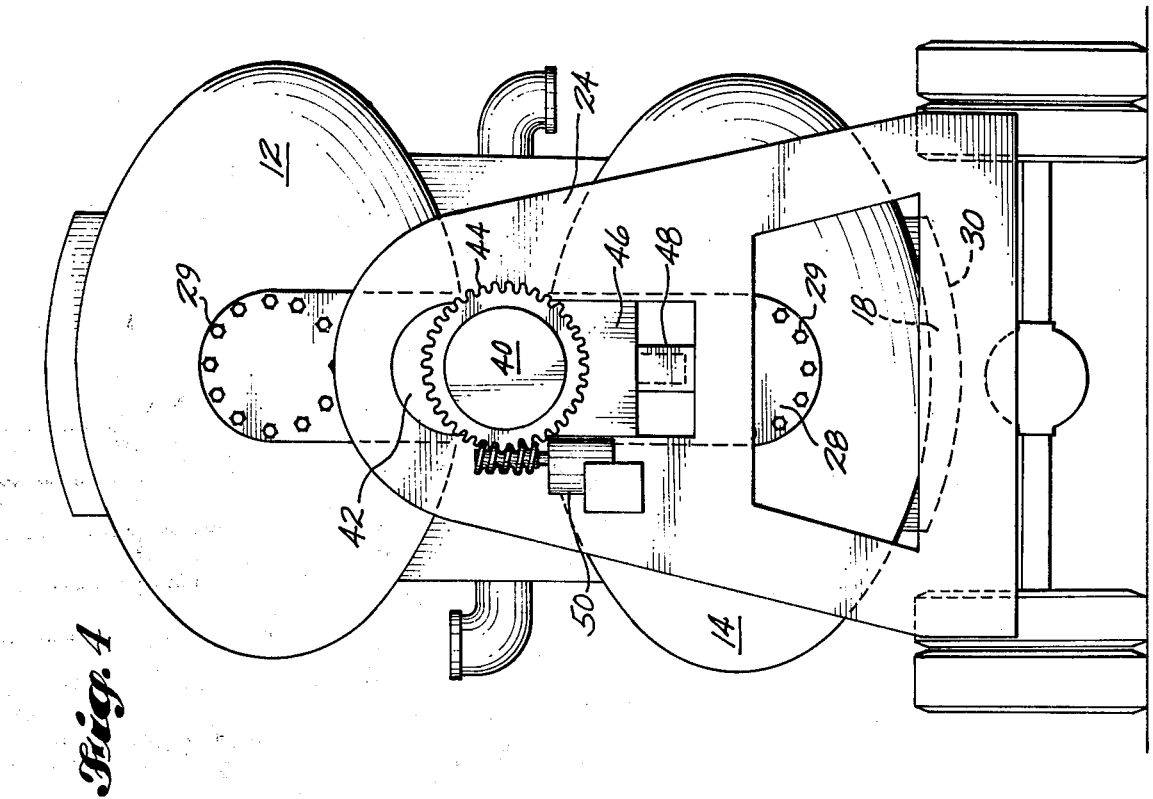
FIG. 4 is a detailed rear elevation of the rotational apparatus and tank support apparatus of the truck shown in FIG. 1.
Figure 3:
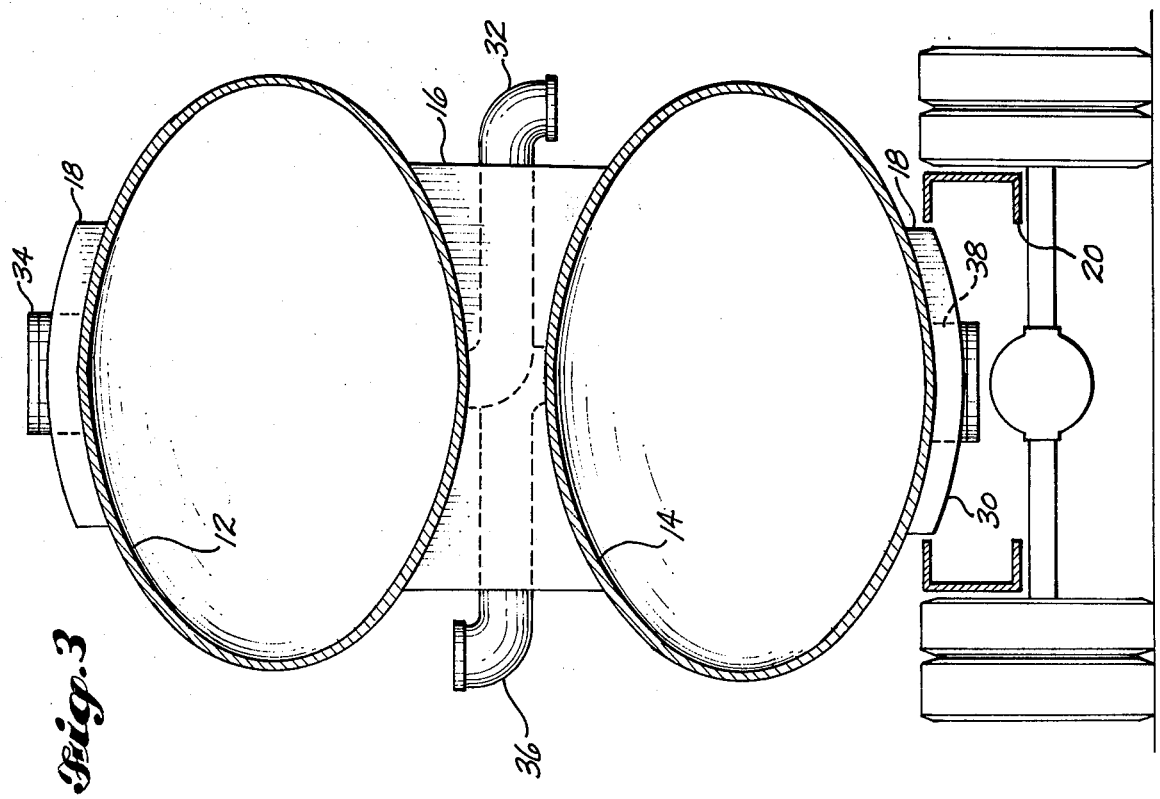
FIG. 3 is a cross section rear elevation of the truck shown in FIG. 1 at a point just ahead of the rotational apparatus.
Figure 5:
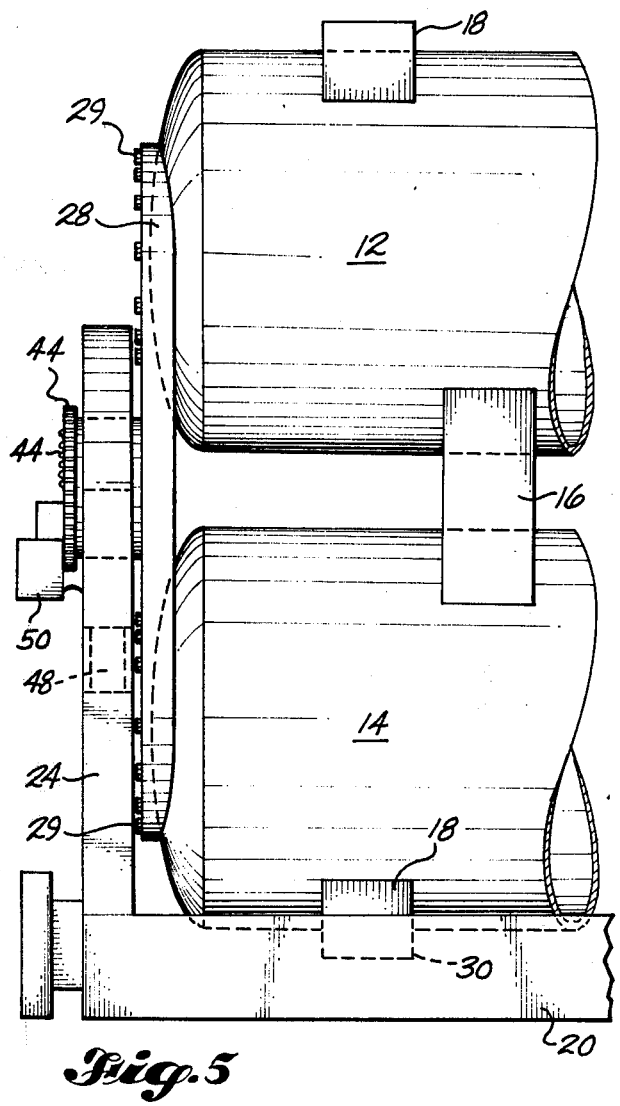
FIG. 5 is a detailed side elevation of the rotational apparatus and tank support apparatus of the truck shown in FIG. 1.

A more detailed showing of the structures previously described in general is contained in FIG. 3, FIG. 4, and FIG. 5. Referring first to FIG. 3, first tank 12 is fastened to spacer 16 which in turn is fastened to second tank 14 holding first tank 12 in generally parallel relationship to second tank 14. Both first tank 12 and second tank 14 have supports 18 attached as shown. Supports 18 are shown as arcuate along the outside surface which would reduce the vertical displacement necessary for clearance of the chassis 20 by supports 18 in the rotation process. Supports 18, however, could be any shape along the outside surface as best suited the particular embodiment. Support 18 on the lower tank (second tank 14 as shown) rests in a matching contoured receptacle 30 of chassis 20. Additionally, first tank 12 is provided with first filling pipe 32 and first emptying pipe 34 while second tank 14 is provided with second filling pipe 36 and second emptying pipe 38.

Figure 2A:
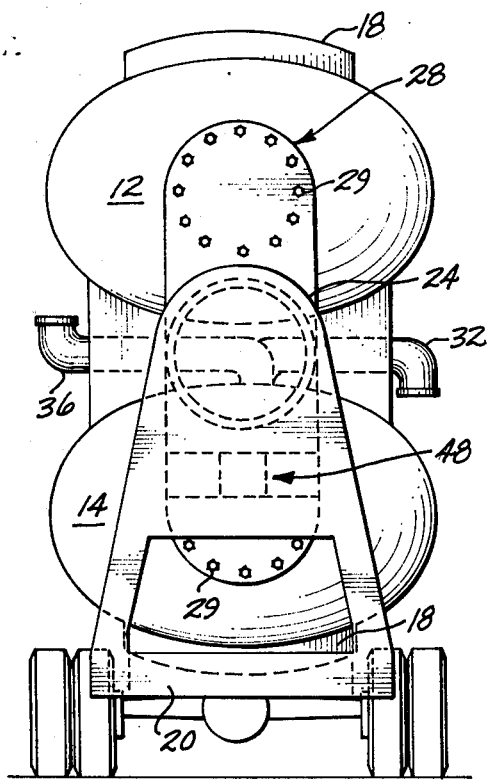
FIG. 2a and FIG. 2b are rear elevations of the truck shown in FIG. 1 showing the rotation of the two tanks.
Figure 2B:
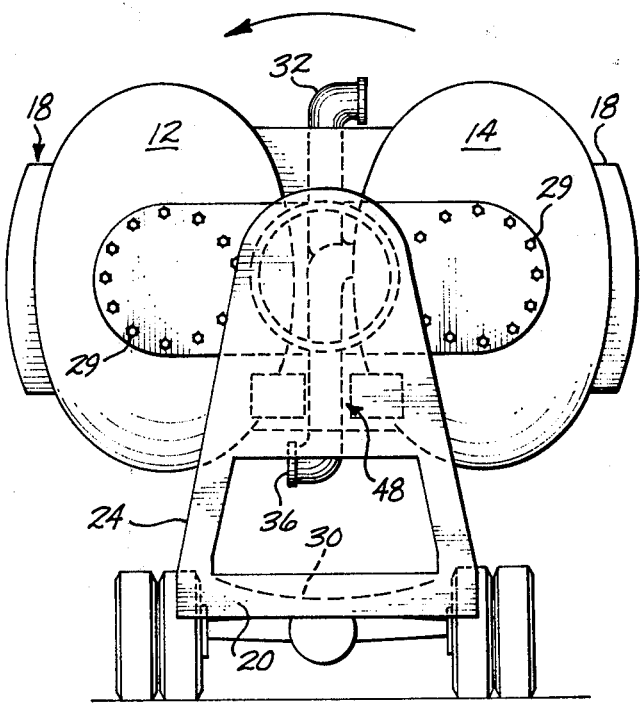

Referring to FIG. 4 and FIG. 5, the rear support and turning apparatus is shown. The rear support and turning apparatus would be substantially identical to the front support and turning apparatus, contained in front support member 22 and front joining plate 26. Rear joining plate 28 is attached to the ends of tanks 12 and 14. Rear main shaft 40 is attached to rear joining plate 28 and passes through rear lifting slot 42 in rear support member 24, terminating in rear drive gear 44. Rear main shaft 40 rests on rear lifting bearing block 46. Rear lifting bearing block 46 can be moved up and down in rear lifting slot 42 by rear hydraulic jack 48. A front hydraulic jack (not shown) is interconnected with the rear hydraulic jack 48 so that they will move up and down in unison thus lifting both ends of the tanks simultaneously. When rear hydraulic jack 48 is raised, rear lifting bearing block 46 if raised, which in turn lifts rear main shaft 40 in rear lifting slot 42 carrying rear joining plate 28 and the lower (second) tank 14 with it. As the lower tank 14 is lifted, supports 18 are lifted clear of matching receptacle 30 in chassis 20 allowing tanks 12 and 14 to be pivoted about rear main shaft 40 and a front main shaft 49 as depicted in FIG. 2a and FIG. 2b. Powered or manual turning means 50 are provided to effect the actual rotation of tanks 12 and 14. Referring to FIG. 2a and FIG. 2b, when first tank 12 has been revolved 180° to the bottom position, first tank 12 becomes the new lower tank and second tank 14 becomes the new upper tank. The rear hydraulic jack 48 (along with the front hydraulic jack) is then lowered, reversing the raising process causing supports 18 to settle into matching receptacles 30 in chassis 20.

Figure 7:
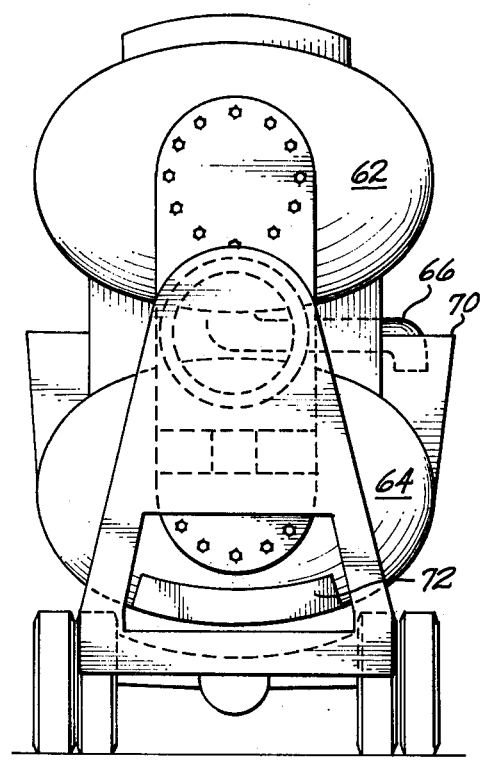
FIG. 7 is a rear elevation of the truck shown in FIG. 6.
Figure 6:
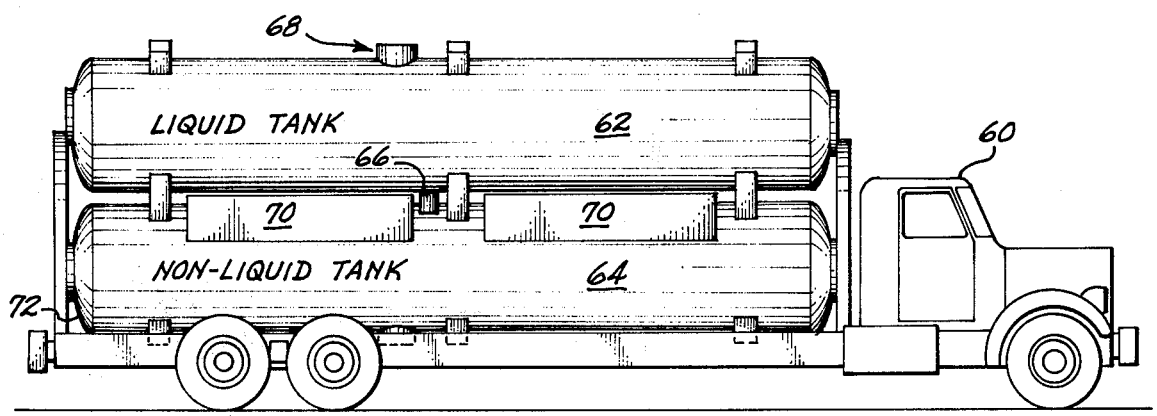
FIG. 6 is a side elevation of a truck employing the present invention in the two tank rotational embodiment having one tank for liquids and one tank for non-liquids.

A second embodiment of the present invention is disclosed by FIG. 6 and FIG. 7. While this second embodiment is identical to the first embodiment in the manner of tank rotational apparatus, it differs in the structure of the actual containers to be used. In a truck 60 employing the second embodiment of the present invention a first tank 62 and a second tank 64 are provided. First tank 62 is a closed tank for liquids having a filling pipe 66 and an emptying pipe 68. Second tank 64 is a semi-closed tank for non-liquids (such as grain) having filling hoppers 70 and emptying gate 72.

Figure 8:
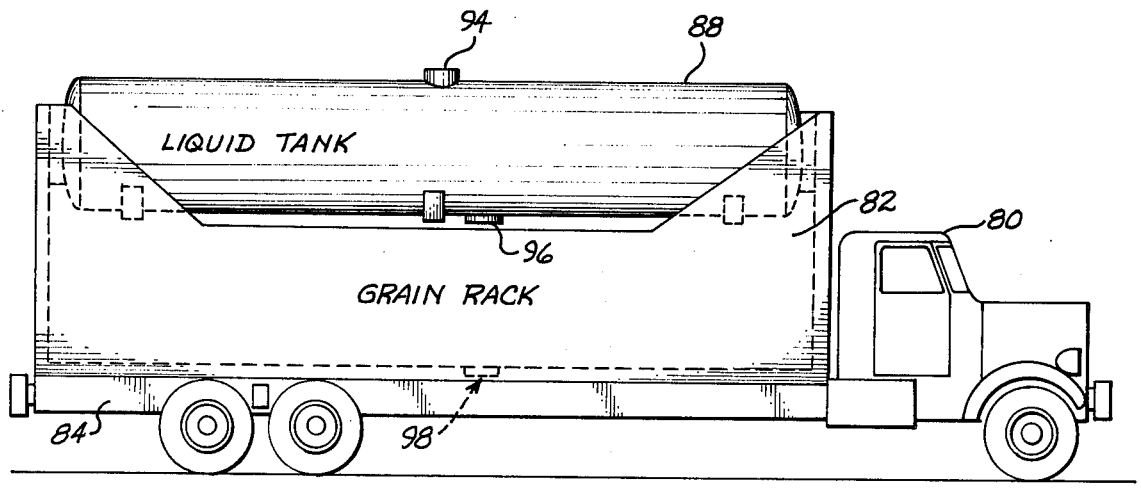
FIG. 8 is a side elevation of a truck employing the present invention in the one tank vertical displacement embodiment.
Figures 9A, 9B:
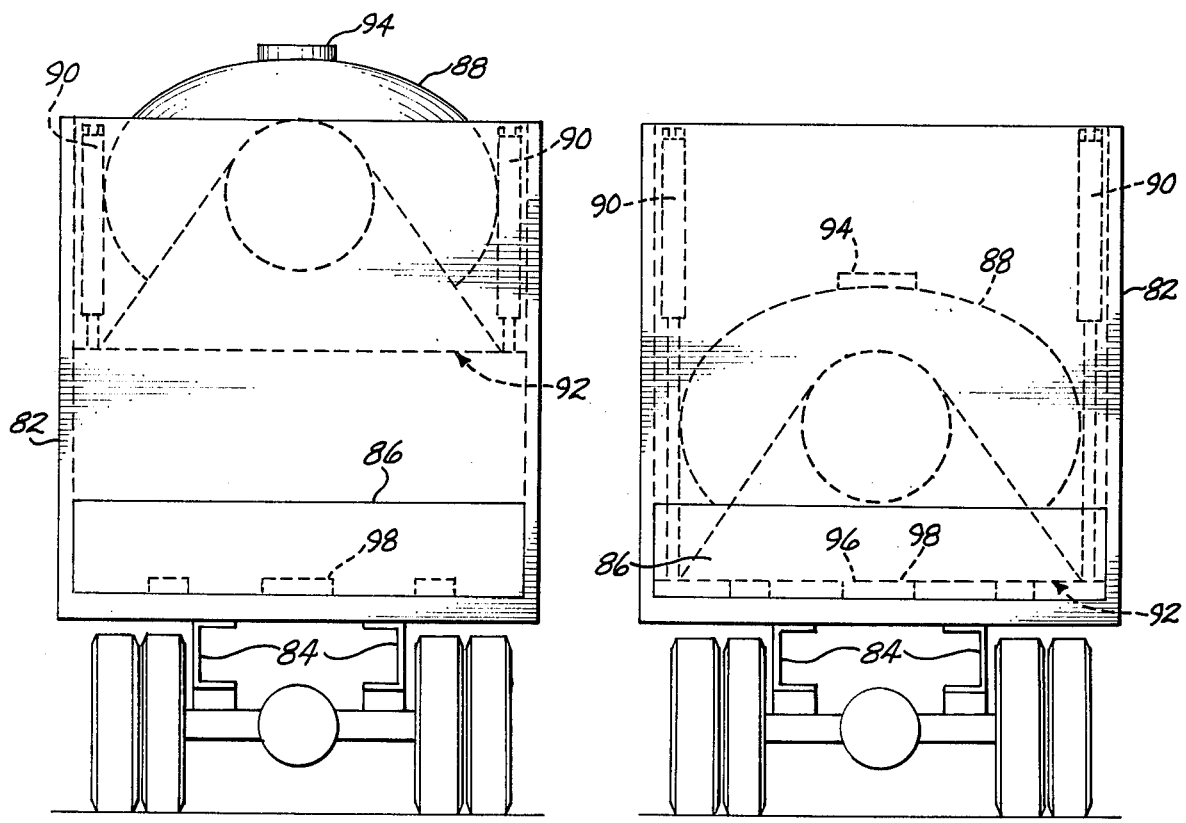
FIGS. 9a and 9b are rear elevations of the truck shown in FIG. 8 showing the vertical displacement of the tank between the empty and loaded positions.

The third embodiment of the present invention is shown in FIGS. 8, 9a, and 9b. The principles of carrying an empty container above the loaded container as disclosed by the present invention remains the same. In this embodiment, however, the empty container is raised and lowered vertically as opposed to rotationally as in the first two embodiments. Truck 80 has an open topped container 82 attached to its chassis 84. While container 82 as shown is described as a grain rack, it could also contain such things as packages or cartons. Container 82 is provided with a door 86 for the removal of the grain. Tank 88 for liquid is suspended by actuators 90 connected between container 82 and suspension brackets 92 attached to tank 88. When container 82 is to be used, actuators 90 hold empty tank 88 above the load in container 82 is shown in FIGS. 8 and 9a. When tank 88 is to be used, it is lowered to the position shown in FIG. 9b by actuators 90. Tank 88 is filled through filling pipe 94 and emptied through drain pipe 96 which passes through closable hole 98 in the floor of the container 82.

Having thus described my invention, what is claimed is:

1. A carrier for freight comprising:
A. a first container;
B. a second container;
C. a vehicle chassis;
D. means operably connected to said first container and said second container for holding said first container and said second container in substantially parallel relationship with each other and for changing the vertical displacement of said first container in relationship to the position of said second container, said first container being at the top of its vertical displacement capability for operation of the carrier for freight with said first container empty and said second container loaded with freight, said first container being at the bottom of its vertical displacement capability for operation of the carrier for freight with said first container loaded with freight and said second container empty, said changing of the vertical displacement of said first container in relationship to the position of said second container is accomplished by rotating said first container and said second container about a common axis in combination said means for holding said first container and said second container in substantially parallel relationship with each other and for changing the vertical displacement of said first container in relationship to the position of said second container comprising:
  a. a front joining plate attached to one end of said first container and one end of said second container;
  b. a rear joining plate attached to the other end said first container and the other end of said second container;
  c. a front main shaft carried by said front joining plate;
  d. a rear main shaft carried by said rear joining plate, said front main shaft and said rear main shaft being located along an axis substantially midway between said first container and said second container, said axis being said common axis of rotation of said first container and said second container in combination;
  e. means carried by said chassis for rotatably supporting said front main shaft and said rear main shaft and for raising and lowering said front main shaft and said rear main shaft in combination to allow said first container and said second container to clear said chassis when said first container and said second container are rotated in combination; and
  f. means for rotating said first container and said second container in combination; and
E. said chassis carrying said means for holding said first container and said second container in substantially parallel relationship with each other and for changing the vertical displacement of said first container in relationship to the position of said second container.

2. A carrier for freight as claimed in claim 1 wherein additionally:
means are carried by said chassis for securing said first container and said second container in combination to said chassis when said carrier for freight is carrying freight.

* * * * *